United States Patent
Goh

(10) Patent No.: US 10,191,881 B2
(45) Date of Patent: Jan. 29, 2019

(54) MODIFICATIONS TO A STREAM PROCESSING TOPOLOGY DURING PROCESSING OF A DATA STREAM

(71) Applicant: Hewlett Packard Enterprise Development LP, Houston, TX (US)

(72) Inventor: Wei Xiang Goh, Singapore (SG)

(73) Assignee: Hewlett Packard Enterprise Development LP, Houston, TX (US)

( * ) Notice: Subject to any disclaimer, the term of this patent is extended or adjusted under 35 U.S.C. 154(b) by 123 days.

(21) Appl. No.: 15/173,859

(22) Filed: Jun. 6, 2016

(65) Prior Publication Data

US 2017/0351633 A1 Dec. 7, 2017

(51) Int. Cl.
*G06F 13/40* (2006.01)
*G06F 13/42* (2006.01)
*G06F 9/38* (2018.01)

(52) U.S. Cl.
CPC ........ *G06F 13/4221* (2013.01); *G06F 9/3885* (2013.01); *G06F 9/3897* (2013.01); *G06F 13/4068* (2013.01)

(58) Field of Classification Search
None
See application file for complete search history.

(56) References Cited

U.S. PATENT DOCUMENTS 5,081,575 A * 1/1992 Hiller .................... G06F 9/3885
710/317
5,214,775 A * 5/1993 Yabushita ........... G06F 12/0284
711/117

(Continued)

FOREIGN PATENT DOCUMENTS

EP 0726529 A2 * 8/1996 ........... G06F 9/3012
JP 2007094847 A * 4/2007 ......... G06F 15/8007

(Continued)

OTHER PUBLICATIONS

"Apache Flink: Scalable Batch and Stream Data Processing" printed on Jun. 6, 2016; from webpage: https://flink.apache.org/; 3 pages.

(Continued)

*Primary Examiner* — Steven G Snyder
(74) *Attorney, Agent, or Firm* — Hewlett Packard Enterprise Patent Department

(57) ABSTRACT

A method, a computing system, and a non-transitory machine readable storage medium containing instructions for managing a stream processing topology are provided. In an example, the method includes receiving a first topology that communicatively couples a plurality of processing elements via a first arrangement of interconnections to perform an operation on a stream of data. A second topology is defined that communicatively couples the plurality of processing elements via a second arrangement of interconnections that is different from the first arrangement. The second topology assigns the plurality of processing elements a first set of operations. The second topology is provided to a stream processing manager and is modified during processing of the stream of data by assigning a second set of operations to the plurality of processing elements that is different from the first set of operations.

18 Claims, 11 Drawing Sheets

(56) References Cited

U.S. PATENT DOCUMENTS

| | | | | |
|---|---|---|---|---|
| 5,682,491 | A | * | 10/1997 | Pechanek ............. G06F 9/3012 710/31 |
| 5,790,880 | A | * | 8/1998 | Ireton ................... G06F 9/3824 712/218 |
| 5,903,771 | A | * | 5/1999 | Sgro ................... G06F 15/8015 712/20 |
| 6,128,720 | A | * | 10/2000 | Pechanek ............ G06F 9/30185 712/15 |
| 7,471,643 | B2 | * | 12/2008 | Stansfield ............. G06F 9/3001 370/254 |
| 7,562,355 | B2 | | 7/2009 | Gu et al. |
| 7,788,465 | B2 | * | 8/2010 | Pires Dos Reis Moreira .............. G06F 9/30072 712/11 |
| 7,996,661 | B2 | * | 8/2011 | Hanai ..................... G06F 9/325 712/15 |
| 8,112,541 | B2 | | 2/2012 | Amini et al. |
| 8,171,259 | B2 | * | 5/2012 | Hanai ................. G06F 9/30072 712/15 |
| 8,286,191 | B2 | | 10/2012 | Amini et al. |
| 8,291,006 | B2 | | 10/2012 | Andrade |
| 8,549,169 | B2 | * | 10/2013 | Branson ............ G06F 17/30516 709/231 |
| 8,560,726 | B2 | * | 10/2013 | Branson ............ G06F 17/30516 709/231 |
| 8,661,014 | B2 | | 2/2014 | Chen |
| 8,745,070 | B2 | | 6/2014 | Krishnamurthy et al. |
| 8,812,487 | B2 | | 8/2014 | Krishnamurthy et al. |
| 9,063,788 | B2 | | 6/2015 | Gedik et al. |
| 9,075,662 | B2 | | 7/2015 | Gedik et al. |
| 9,081,870 | B2 | | 7/2015 | Sax et al. |
| 9,098,350 | B2 | | 8/2015 | Gedik |
| 9,146,896 | B2 | * | 9/2015 | Furukawa ............ G06F 9/3001 |
| 9,183,107 | B2 | * | 11/2015 | Branson ............. G06F 11/3048 |
| 9,195,559 | B2 | * | 11/2015 | Branson ............. G06F 11/3048 |
| 9,720,879 | B2 | * | 8/2017 | Sutou ................. G06F 15/7867 |
| 9,747,343 | B2 | * | 8/2017 | Barsness .......... G06F 17/30516 |
| 9,747,344 | B2 | * | 8/2017 | Barsness .......... G06F 17/30516 |
| 9,891,912 | B2 | * | 2/2018 | Balakrishnan ............ G06F 7/36 |
| 10,078,513 | B2 | * | 9/2018 | Balakrishnan ............ G06F 7/36 |
| 2004/0103265 | A1 | * | 5/2004 | Smith .................. G06F 15/177 712/15 |
| 2006/0184766 | A1 | * | 8/2006 | Pires Dos Reis Moreira .............. G06F 9/30072 712/15 |
| 2008/0205582 | A1 | * | 8/2008 | Furukawa ............. G11C 19/00 377/77 |
| 2009/0083527 | A1 | * | 3/2009 | Hanai ..................... G06F 9/325 712/241 |
| 2009/0172352 | A1 | * | 7/2009 | Sutou ................. G06F 15/7867 712/29 |
| 2009/0319762 | A1 | * | 12/2009 | Hanai ................. G06F 9/30072 712/233 |
| 2010/0293301 | A1 | * | 11/2010 | Amini .................... G06F 9/544 710/12 |
| 2010/0332795 | A1 | * | 12/2010 | Furukawa ............. G06F 9/3001 712/29 |
| 2011/0060890 | A1 | | 3/2011 | Tanaka et al. |
| 2011/0185152 | A1 | * | 7/2011 | Sutou .................. G06F 15/7867 712/29 |
| 2012/0311172 | A1 | * | 12/2012 | Branson .................. H04L 65/60 709/231 |
| 2013/0054779 | A1 | * | 2/2013 | Cradick ................ G06F 15/173 709/224 |
| 2013/0080654 | A1 | * | 3/2013 | Branson .................. H04L 65/60 709/231 |
| 2014/0122557 | A1 | | 5/2014 | Branson et al. |
| 2014/0164601 | A1 | * | 6/2014 | Branson ............. G06F 11/3048 709/224 |
| 2014/0164628 | A1 | * | 6/2014 | Branson ............. G06F 11/3048 709/227 |
| 2016/0246846 | A1 | * | 8/2016 | Barsness .......... G06F 17/30516 |
| 2016/0248688 | A1 | * | 8/2016 | Barsness .......... G06F 17/30516 |

FOREIGN PATENT DOCUMENTS

| | | | |
|---|---|---|---|
| JP | 2008066875 A | * | 3/2008 |
| JP | 5045036 B2 | * | 10/2012 |
| WO | WO 2007047321 A2 | * | 4/2007 ......... G06F 13/1663 |

OTHER PUBLICATIONS

"S4: Distributed Stream Computing Platform"; Jun. 2013: webpage: https://incubator.apache.org/s4/; 2 pages.

"Samza"; printed on Jun 2, 2016; from webpage https://samza.apache.org/; 2 pages.

Akidau, T., et al.; "MillWheel: Fault-tolerant Stream Processing at Internet Scale" Proc. VLDB Endow., vol. 6, No. 11. (Aug. 2013), pp. 1033-1044.

Apache Spark printed on Jun. 2, 2016 from webpage: https://spark.apache.org/streaming/ 2 pages.

Apache Storm; printed on Jun. 2, 2016 from webpage: https://storm.apache.org/; 4 pages.

Brinkmeier, M. et al., "Optimally DoS Resistant P2P Topologies for Live Multimedia Streaming," (Research Paper), Parallel and Distributed Systems, IEEE Transactions on 20.6, 2009, pp. 831-844, https://www.p2p.tu-darmstadt.de/fileadmin/user_upload/Group_P2P/strufe09class_final.pdf.

Gedik, B. et al., "Spade: the System S Declarative Stream Processing Engine," (Research Paper), Proceedings of the 2008 ACM SIGMOD International Conference on Management of Data, ACM, Jun. 9-12, 2008, pp. 1123-1134, available at http://cs.ucsb.edu/~ckrintz/papers/gedik_et_al_2008.pdf.

Github, "StreamFlow™," (Web Page), Jan. 4, 2015, 1 page, available at https://github.com/lmco/streamflow/wiki.

Kulkarni,, S., et al. "Twitter Heron: Stream Processing at Scale" In Proceedings of the 2015 ACM SIGMOD International Conference on Management of Data (2015), pp. 239-250.

Shearer, C., "The CRISP-DM Model: The new blueprint for data mining."; Journal of Data Warehousing, vol. 5, No. 4. (2000), pp. 13-22.

* cited by examiner

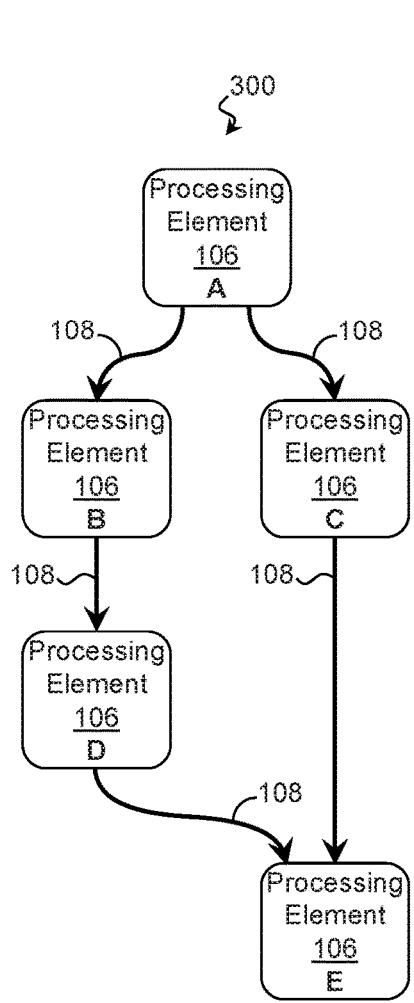
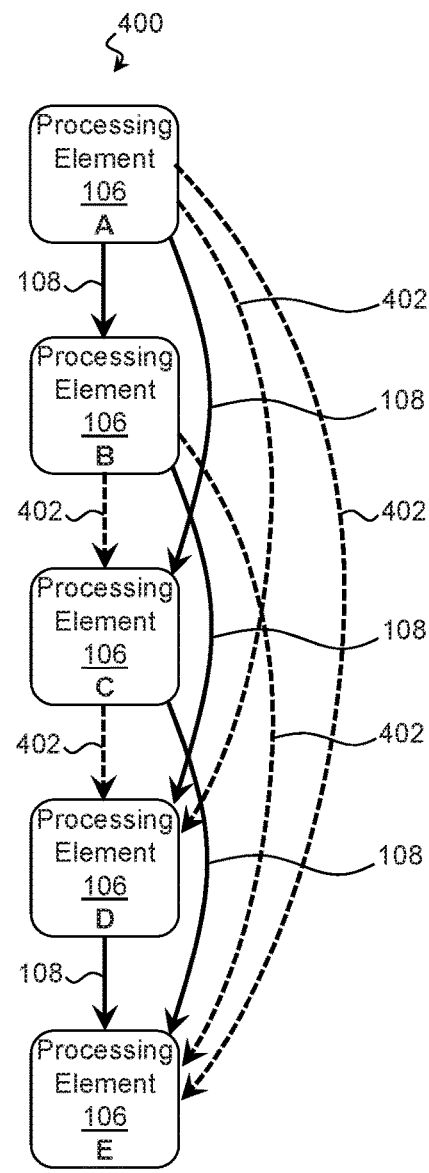
FIG. 3
FIG. 4

MODIFICATIONS TO A STREAM PROCESSING TOPOLOGY DURING PROCESSING OF A DATA STREAM

BACKGROUND

As computing systems have improved in performance, they have been adapted for a wide range of data processing roles. Some applications call for systems that can process incoming data as it arrives rather than waiting for a complete data set. This may be referred to as stream processing. At any given time, a stream processing pipeline may include data in various stages of the process. While a first portion of the data stream is being received, older portions of the stream may already be undergoing processing, and other portions of the stream of data may already have completed. For this reason and others, significantly different system architectures may be used for stream processing applications than static processing applications, and managing such architectures is a considerable task for even the most modest stream applications.

BRIEF DESCRIPTION OF THE DRAWINGS

Certain examples are described in the following detailed description with reference to the drawings, of which:

FIG. 3 is a diagram of a logical topology design according to some examples of the present disclosure.

FIG. 4 is a diagram of a logical topology implementation according to some examples of the present disclosure.

DETAILED DESCRIPTION OF SPECIFIC EXAMPLES

Figure 1:
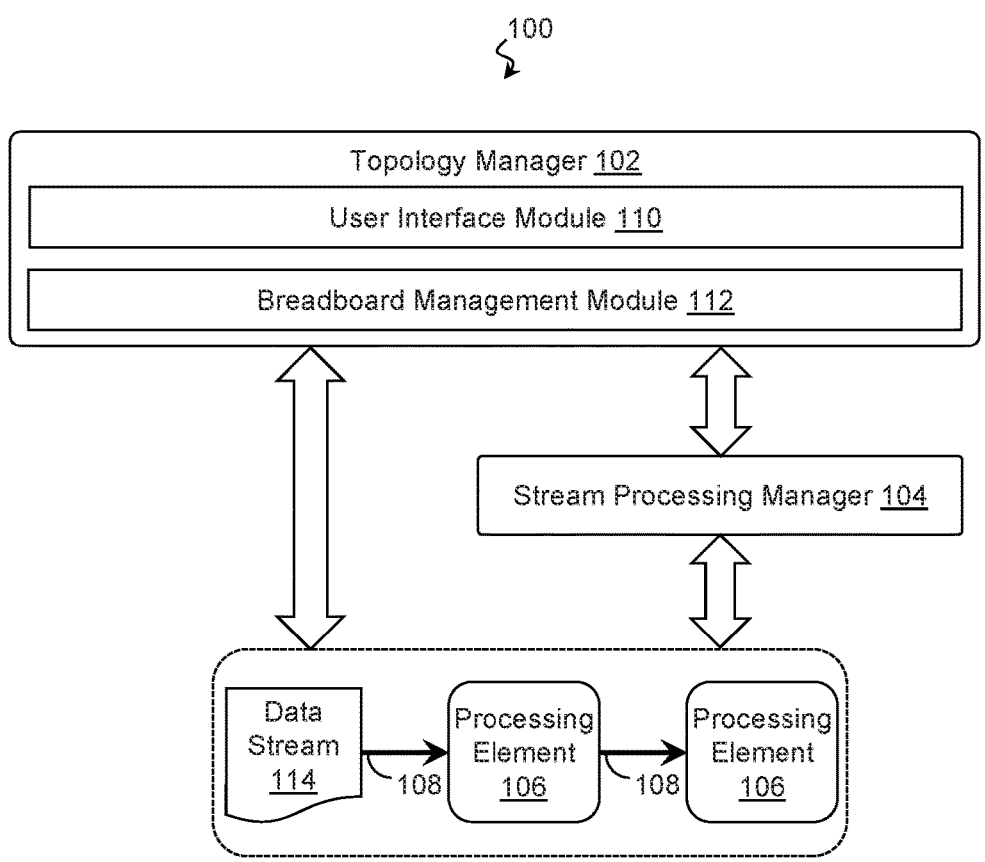
FIG. 1 is a block diagram of a stream processing architecture according to some examples of the present disclosure.

In stream processing, a potentially limitless amount of data is received over some interval of time. The data may be processed, transformed, and analyzed as it is received in order to provide real-time results. Stream processing is well-suited for dynamic data sets including web content, global positioning data, weather data, census data, sales data, supply chain data, business metrics, and others. To process this data, processing elements, which may range from a single processing core to several discrete computing systems acting together, are arranged in a topology such that the output of some processing elements is used as input for other processing elements downstream. The processing elements operate on the data set as it is received and may begin to produce output before the stream has completed. In fact, the stream may not complete at all, and the processing elements may provide a final result that continues to be updated as new data streams in.

A stream processing manager may be used to generate the topology and to control operation of the processing elements. In an example, a developer specifies operations to be applied to the data stream in the form of a logical topology and provides the logical topology to the stream processing manager. From the logical topology, the manager creates a runtime topology that allocates processing elements to the various operations of the logical topology. The manager implements the runtime topology by assigning the operations to the respective processing elements and by directing the flow of data between the processing elements. The manager may also monitor for failures and perform other administrative tasks.

The processing elements operate on the data stream according to the runtime topology to produce a result. However, if the result is not the desired result, the developer may modify the operations and/or the flow of data through the processing elements. Some stream processing managers stop the flow of data and stop each of the processing elements before implementing any modifications. Once the existing topology has been taken offline, the new topology may be implemented, and the processing elements may be restarted. This can take a significant amount of time, and the stream of data may or may not cease during this time. Accordingly, in some applications, data may be lost during the change. Whether data is lost or not, the overhead of stopping and restarting the processing elements may discourage developers from frequently modifying the operations applied to the data stream.

To address this issue and others, the present disclosure provides a system and technique for dynamically modifying the logical topology of a stream processing system without stopping the processing elements. This avoids the delay and possible data loss associated with taking the processing elements offline and may encourage data exploration and greater optimization of the topology.

In an example, the system includes a topology manager that develops a logical topology to implement and a stream processing manager that implements the topology. The topology manager creates a breadboard topology that contains a set of placeholder processing elements connected by a number of interconnections. The breadboard topology may contain enough interconnections to implement any topology that uses the same number of processing elements or fewer in order to give the user a great deal of flexibility.

A user interacts with the topology manager to provide a first logical topology (i.e., a logical topology design) that defines a set of operations to be performed on a data stream. The topology manager implements the logical topology design using the breadboard topology by assembling a second logical topology (i.e., a logical topology implementation) that performs the same user-defined set of operations as the first. Because it is based on the breadboard topology, the second logical topology may include more interconnections than the first logical topology, and data received over some of these interconnections may be ignored by the receiving processing element. However, this data can be utilized at a later time by merely changing the element-level operations assigned to the respective processing elements.

Continuing the example, the second topology (the logical topology implementation) is provided to the stream processing manager to implement. The stream processing manager implements this topology by coupling the processing elements using the specified interconnections and by providing the processing elements their respective element-level operations. Once completed, the processing elements may begin to process the data stream.

At any time including during the processing, the topology manager may inject new operations into the processing elements, and the new operations can utilize previously ignored inter-element output provided by the interconnections. In other words, the extraneous interconnections allow the processing elements to be effectively reconnected in new ways. It is worth noting that the topology manager can make these changes without the involvement of the stream processing manager. In fact, because the interconnections are not actually reconfigured or reconnected, the topology manager can modify the topology during processing of the data stream even if the stream processing manager does not support this.

By these mechanisms and others, the present disclosure provides substantial real-world improvements to data stream processing and resolves several issues pertaining to reconfiguring a topology while processing is underway. For instance, by including extra interconnections in the logical topology implementation, the topology manager may reconfigure the topology to use the extra connections without involving the stream processing manager. Thus, changes may be made during data processing even when the stream processing manager does not support online changes. This allows developers to explore options and creatively redefine the operation of the topology while the data stream is in flight. In some examples, the logical topology implementation contains exactly enough interconnections to implement any set of operations that involve the same number of processing elements. This provides a balance between flexibility and complexity of the implemented topology without wasting interconnection resources.

These and other examples are described with reference to the following figures. Unless noted otherwise, these figures and their accompanying description are non-limiting and no element is characteristic of any particular example. In that regard, features from one example may be freely incorporated into other examples without departing from the spirit and scope of the disclosure.

FIG. 1 is a block diagram of a stream processing architecture 100 according to some examples of the present disclosure. The architecture 100 includes a topology manager 102 in communication with a stream processing manager 104 and a set of processing elements 106. At a high level, the topology manager 102 receives a set of user instructions and provides a topology to the stream processing manager 104. The stream processing manager 104 implements the topology using the processing elements 106 and a set of interconnections 108 between the processing elements 106 to control the flow of data. The topology is such that the topology manager 102 may make modifications to the topology without involving the stream processing manager 104. The operation of each of these elements is described in more detail below.

With respect to the topology manager 102, the manager 102 may take any suitable form such as a desktop computer, a laptop computer, a server, a switch, a router, and/or a portable device. For clarity and ease of explanation, the topology manager 102 is represented as a single entity, although the manager 102 may include any number of computing devices operating together in order to perform a common function. In that regard, the topology manager 102 may include a single unitary computing device, a cluster of discrete computing devices, or any permutation thereof.

The topology manager 102 may include a user interface module 110 operable to receive user input from any number of user input devices such as a keyboard, a mouse, a touchscreen, a haptic input device, a microphone, etc. The user input may be used to construct a logical topology, to specify a data stream, to start and stop stream processing, to check and verify status of the stream processing environment, and/or any other suitable purpose. The user interface module 110 may provide output to a user by way of any number of output devices including a monitor or other graphical display, a printer, a speaker, a haptic feedback device, etc. In various examples, the user interface module 110 provides a representation of a topology, status of the stream processing environment, interim and/or final results of data stream processing, and/or other suitable data.

The user interface module 110 may be communicatively coupled to a breadboard management module 112 of the topology manager 102, and the input received by the user interface module 110 may be provided to the breadboard management module 112 for use in constructing one or more topologies. In particular, in some examples, the breadboard management module 112 is operable to receive a logical topology design from the user and to construct a logical topology implementation from the logical topology design. The logical topology implementation may implement the same functionality as the logical topology design but may specify different interconnections 108 between processing elements 106. The nature of these topologies and the functionality of the breadboard management module 112 are described in detail below.

The breadboard management module 112 may also be operable to modify an implemented topology by providing sets of operations directly to the processing elements 106 and to receive data, status, and other information from the processing elements 106. The information received from the processing elements 106 may be fed back to the user by the breadboard management module 112 via the user interface module 110.

Turning next to the stream processing manager 104, this element is operable to receive the logical topology implementation from the breadboard management module 112 and to implement it by controlling the operation of the processing elements 106 and by directing the flow of data across the set of interconnections 108. The stream processing manager 104 may be part of the topology manager 102 or may be a separate computing entity.

Together the stream processing manager 104 and the topology manager 102 control the operation of the processing elements 106. The processing elements 106 are operable to receive operations from the stream processing manager 104 and/or the topology manager 102 and to perform the operations on at least a portion of a data stream 114. Each processing element 106 represents a number of processing device of any type and configuration such as one or more individual processor cores, CPUs, GPUs, microcontrollers, ASICS, FPGAs, and/or other processing devices. As with the topology manager 102 and stream processing manager 104, each processing element 106 may represent any number of computing systems, and in various examples, a processing element 106 represents a single computing system and/or a cluster of computing systems.

The processing elements 106 are communicatively coupled to each other via a set of interconnections 108 such that output of some processing elements 106 may be connected to inputs of other processing elements 106. The interconnections 108 may conform to any suitable communication modality such as an inter-core processor bus, PCI, PCI Express, Fibre Channel, Ethernet, IEEE 802.11 WiFi, and/or other wired or wireless modalities. In this way, the elements of the processing environment interact so that the processing elements 106 may be used to process an incoming data stream 114 in the manner specified by the user.

The data stream 114 operated on by the processing elements 106 may be of any size and may have any structure. In an example, the data stream 114 includes an unbounded sequence of tuples received over time. Stream processing is often used to analyze real-world data, and the data stream 114 may include audio samples, digital video, global positioning data, weather data, census data, sales data, supply chain data, business metrics, web content, and/or any other suitable data.

Figure 2:
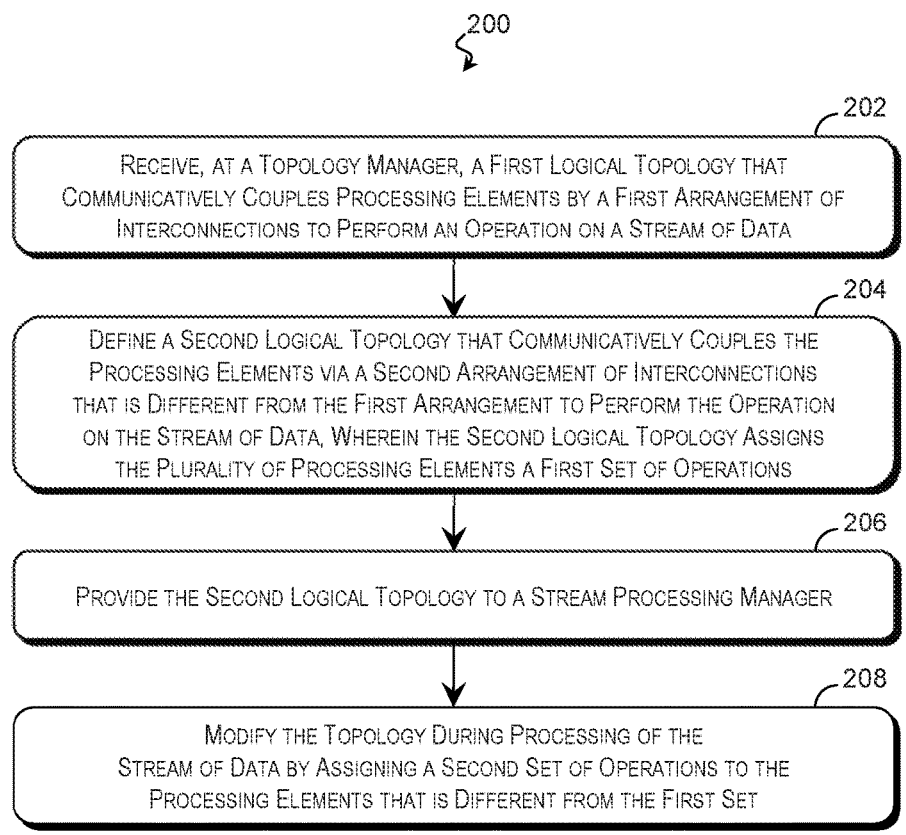
FIG. 2 is a flow diagram of a method of implementing a stream processing topology according to some examples of the present disclosure.

A technique for processing such a stream of data is described with reference to FIGS. 2-4. In that regard, FIG. 2 is a flow diagram of a method 200 of implementing a stream processing topology according to some examples of the present disclosure. It is understood that the description of method 200 is non-limiting, and steps may be added to and omitted from the method 200 without departing from the disclosure. Furthermore, unless noted otherwise, processes of the method 200 may be performed in any order including being performed concurrently by one or more entities. FIG. 3 is a diagram of a logical topology design 300 according to some examples of the present disclosure. FIG. 4 is a diagram of a logical topology implementation 400 according to some examples of the present disclosure. The technique is suitable for performing using the using the architecture 100 of FIG. 1 or any other suitable stream processing architecture.

Referring first to block 202 of FIG. 2 and FIG. 3, a topology manager 102 or other computing entity receives a first logical topology (e.g., logical topology design 300). In an example, the first logical topology is received by a user interface module 110 in the form of user instructions and is provided to a breadboard management module 112.

The first logical topology communicatively couples a set of processing elements 106 via a set of interconnections 108 to perform an operation on a data stream 114. An example of a suitable topology, designated logical topology design 300, is shown in FIG. 3. The logical topology design 300 is represented as a directed acyclic graph and divides the overall operations into element-level operations to be performed by the set of processing elements 106. The logical topology design 300 also specifies the flow of data between the processing elements via the set of interconnections 108. While the example of FIG. 3 includes five processing elements 106, it is understood that a logical topology design 300 may include any number of processing elements 106 and interconnections 108. Element-level operations assigned to the processing elements 106 are designated A, B, C, D, and E.

Referring to block 204 of FIG. 2 and to FIG. 4, the breadboard management module 112 or other computing element of the topology manager 102 defines a second logical topology for implementation (e.g., logical topology implementation 400) based on the first logical topology (logical topology design 300). As with the first logical topology, the second logical topology communicatively couples the processing elements 106 via the set of interconnections 108 to perform an operation on a data stream 114.

An example of a suitable topology, designated logical topology implementation 400, is shown in FIG. 4. The logical topology implementation 400 specifies element-level operations to be performed by the processing elements 106. Here as well, element-level operations assigned to the processing elements 106 are designated A, B, C, D, and E and correspond to those of FIG. 3.

While the logical topology implementation 400 may perform the same overall and/or element-level operations on the data stream as the logical topology design 300, it may include an alternative arrangement of interconnections 108. In some examples, the logical topology implementation 400 has sufficient interconnections 108 that any alternative topology that uses the same number of processing elements 106 (or fewer) can be implemented without adding new interconnections 108. In the examples of FIG. 4, interconnections that communicate data that is unused by the receiving processing element are indicated by dashed lines and reference number 402. In all other regards, interconnections 402 may be substantially similar to interconnections 108. Accordingly, data received over these interconnections 402 may be utilized at any time by merely changing the element-level operations of the receiving processing element 106.

Referring to block 206 of FIG. 2, the second topology (logical topology implementation 400) is provided to the stream processing manager 104. The stream processing manager 104 may then implement the second topology by assigning element-level operations to the processing elements 106, defining the interconnections 108 between the processing elements 106, and/or initializing the processing elements 106 and the interconnections 108. Once implemented and initialized, the stream processing manager 104 begins processing of the incoming data stream 114 by the processing elements 106.

Referring to block 208 of FIG. 2, at any time including during the processing of the data stream, the breadboard management module 112 of the topology manager 102 may modify the topology and the operations performed on the data stream by simply assigning a new set of element-level operations to the processing elements 106. These new element-level operations may effectively change the arrangement of the processing elements 106 by utilizing data received across interconnections 402 that was previously ignored. This may be performed by providing the operations from the topology manager 102 to the processing elements 106 without involving the stream processing manager 104. Because the interconnections 108 and 402 themselves are unchanged, in many examples, the modifications to the implemented topology may be made while the data stream is being processed without restarting the processing elements 106 or the environment. Accordingly, the method 200 provides an efficient technique for modifying a stream processing framework without restarting even when the stream processing manager 104 does not support such changes itself.

Figure 5:
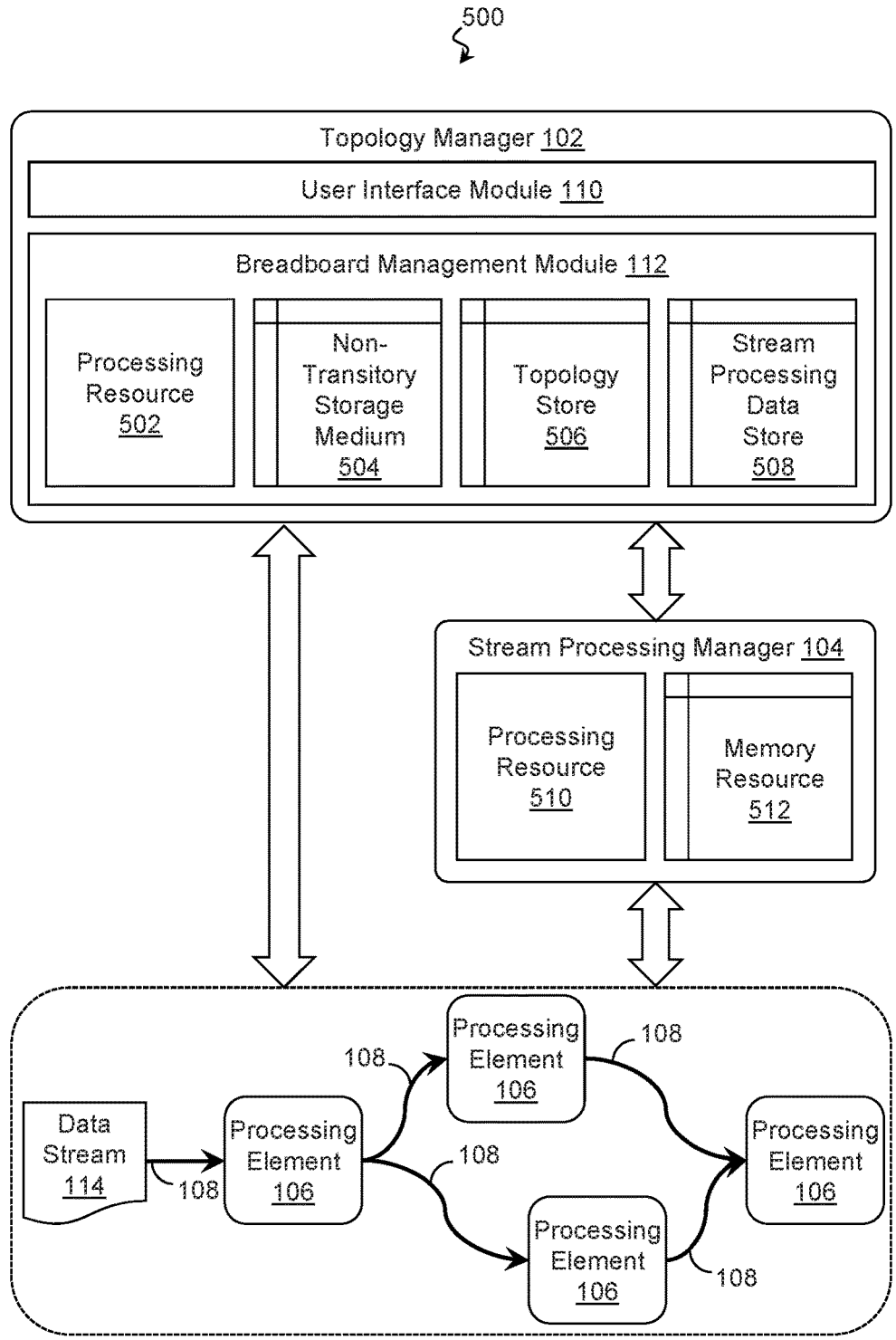
FIG. 5 is a block diagram of a stream processing architecture according to some examples of the present disclosure

Further examples of a suitable architecture are described with reference to FIG. 5, which is a block diagram of a stream processing architecture 500 according to some examples of the present disclosure. In many respects, the stream processing architecture 500 may be substantially similar to the stream processing architecture 100 of FIG. 1. For example, the architecture 500 includes a topology manager 102 in communication with a stream processing manager 104 and a set of processing elements 106. The topology manager 102 and the stream processing manager 104 control the processing elements 106 and the flow of data between the processing elements 106 across a set of interconnections 108 to control the processing of a data stream 114. The operations performed by the processing elements 106 and the configuration of the interconnections 108 define a topology according to which the data stream 114 is processed.

The topology manager 102 may be substantially similar to the topology manager of FIG. 1 and may include a user interface module 110 that is operable to receive user input and a breadboard manager module 112 that is operable to construct a logical topology from the user input. For these purposes and others, the breadboard manager module 112 may include one or more processing resources 502. The illustrated processing resource 502 may include any number and combination of Central Processing Units (CPUs), Graphics Processing Units (GPUs), microcontrollers, Application-Specific Integrated Circuits (ASICs), Field-Programmable Gate Arrays (FPGAs), and/or other processing resources. The processing resource 502 may be shared between the user interface module 110 and the breadboard management module 112 and may perform tasks associated with either or both modules.

To control the processing resource 502, the breadboard management module 112 may include a non-transitory machine readable storage medium 504 that is operable to store instructions for execution by the processing resource 502. The non-transitory machine readable storage medium 504 may include any number of non-transitory memory devices including battery-backed RAM, SSDs, HDDs, optical media, and/or other memory devices suitable for storing instructions, and some example instructions for control of a stream processing topology that may be stored on the non-transitory memory devices are described in detail below.

The breadboard management module 112 may also include other types of memories such as a topology store 506 and/or a stream processing data store 508. The topology store 506 may be used to store various topologies and/or related information, and the stream processing data store 508 may be used to store status of the processing elements 106, results from the processing elements 106, and/or any other suitable data. Each of the topology store 506 and the stream processing data store 508 may include any type of suitable memory device such as, but not limited to, RAM, battery-backed RAM, SSDs, HDDs, optical media, and/or other memory devices and may share at least some memory in common with the non-transitory machine readable storage medium 504.

With respect to the stream processing manager 104, the manager 104 may include a processing resource 510 substantially similar to the processing resource 502 of the topology manager 102. In that regard, the processing resource 510 of the stream processing manager 104 may include any number of CPUs, GPUs, microcontrollers, ASICS, FPGAs, and/or other processing resources. In some examples, the processing resource 510 of the stream processing manager 104 shares at least one processing element in common with the processing resource 502 of the topology manager 102. Furthermore, the topology manager 102 may include a memory resource 512 substantially similar to the non-transitory machine readable storage medium 504, the topology store 506, and/or the stream processing data store 508 of the topology manager 102.

Figure 6:
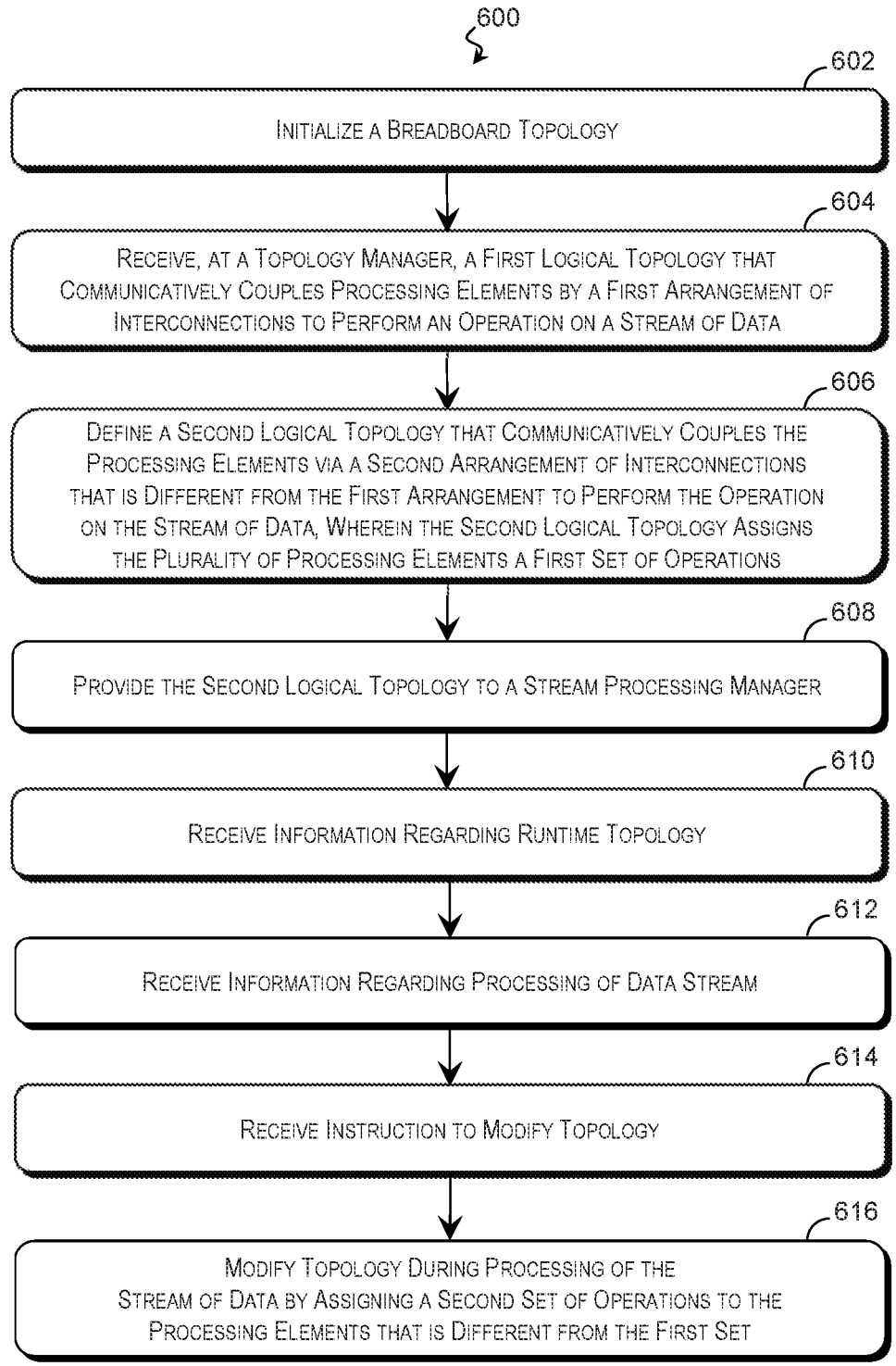
FIG. 6 is a flow diagram of a method of implementing a stream processing topology according to some examples of the present disclosure.
Figure 7:
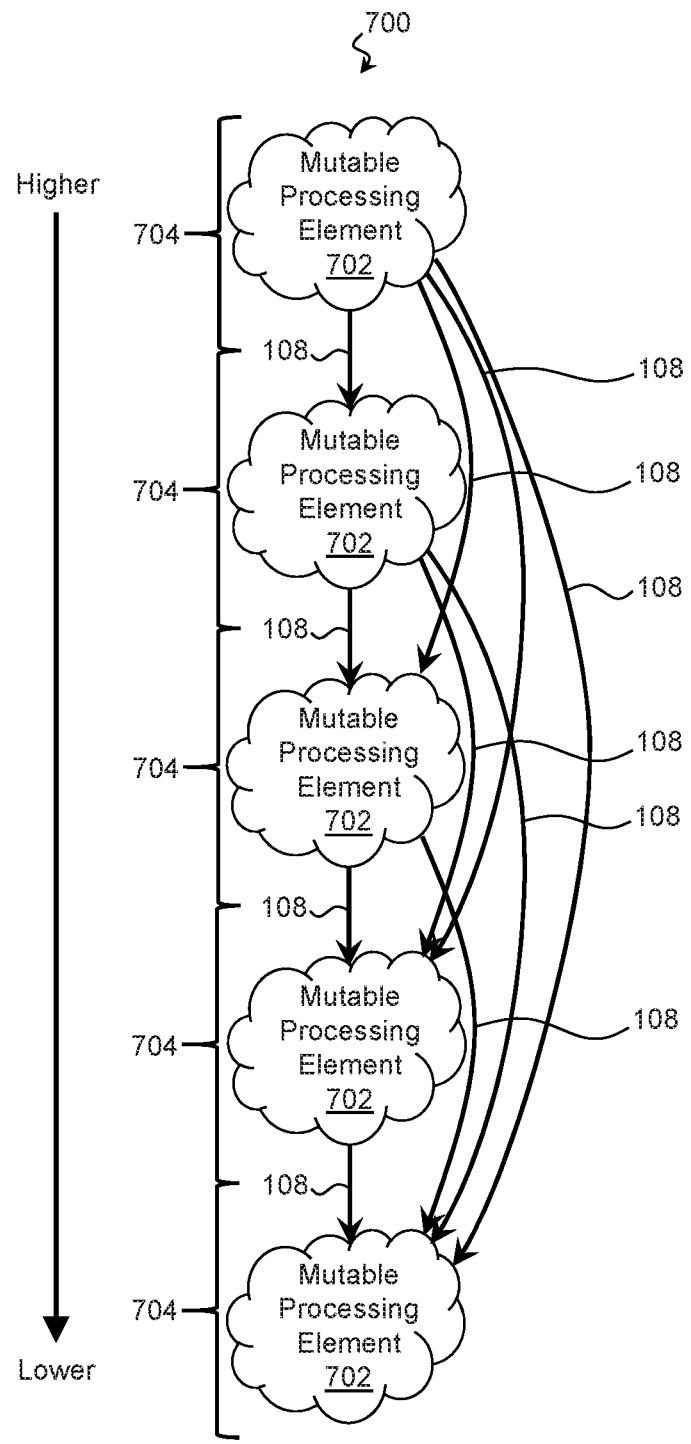
FIG. 7 is a diagram of a breadboard topology according to some examples of the present disclosure.
Figure 8:
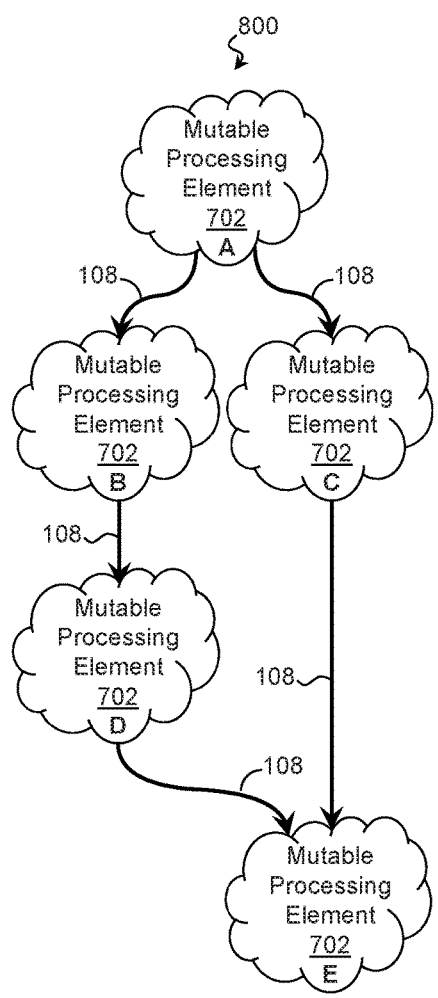
FIG. 8 is a diagram of a logical topology design according to some examples of the present disclosure.
Figure 9:
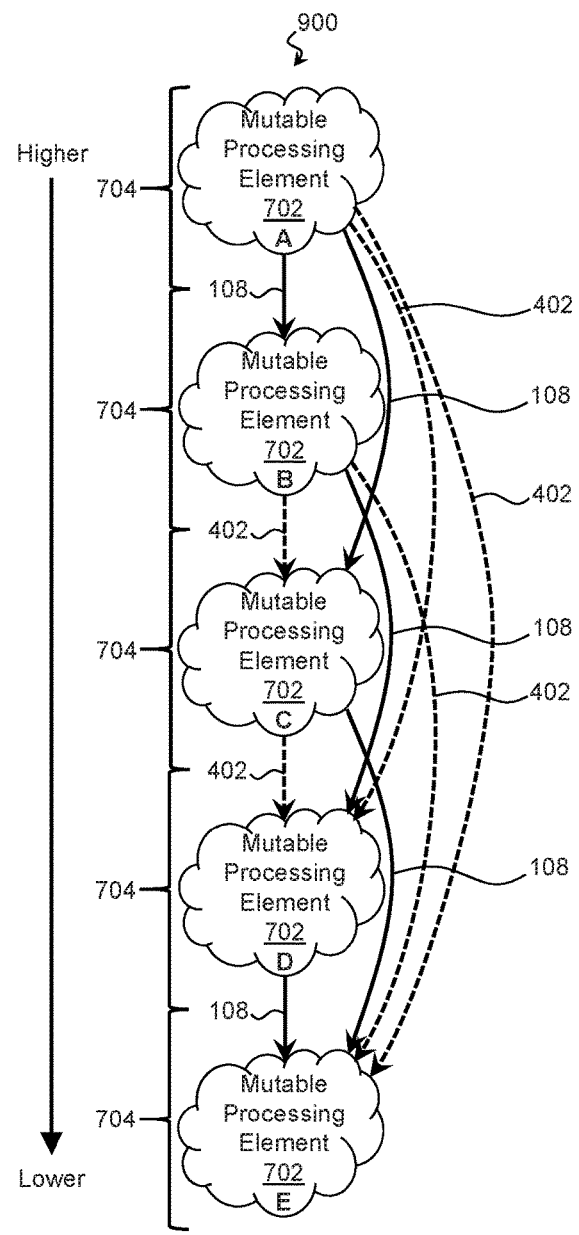
FIG. 9 is a diagram of a logical topology implementation according to some examples of the present disclosure.
Figure 10:
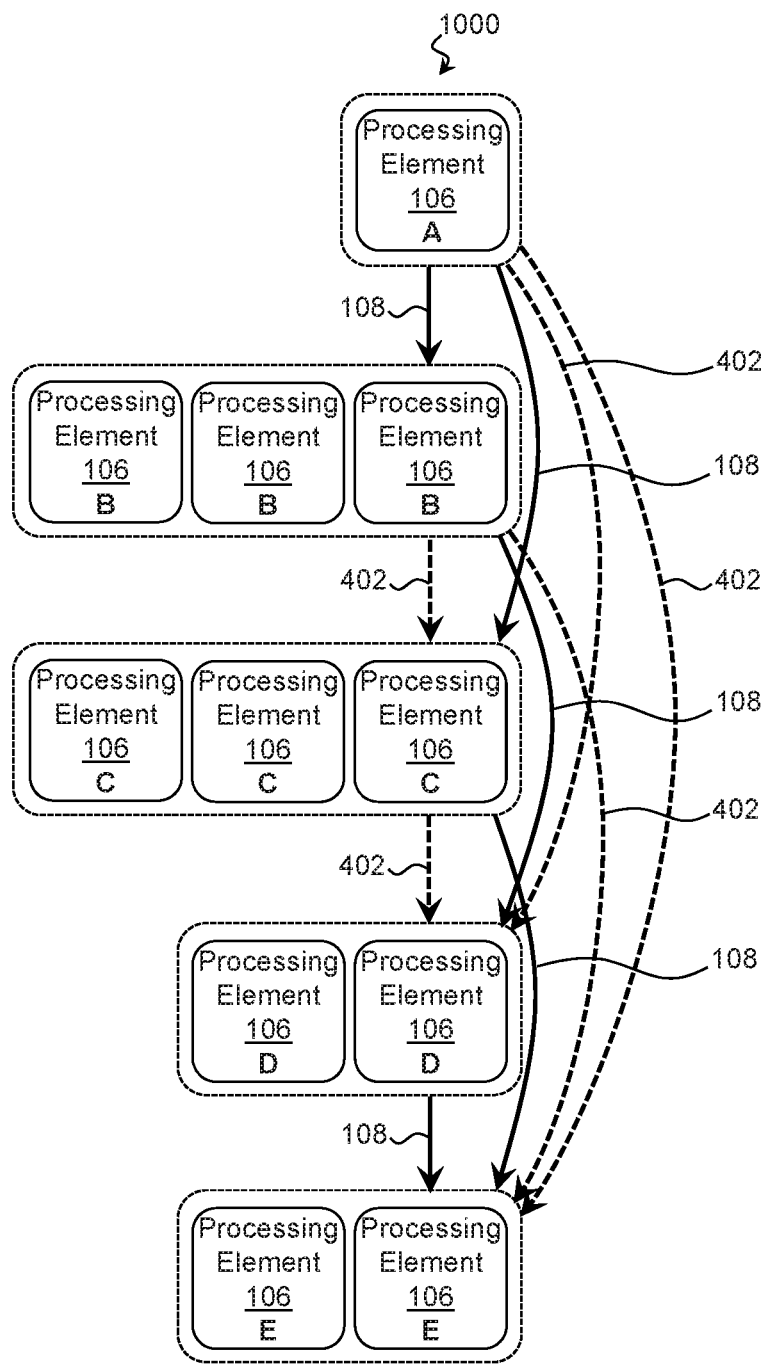
FIG. 10 is a diagram of a runtime topology according to some examples of the present disclosure.
Figure 11:
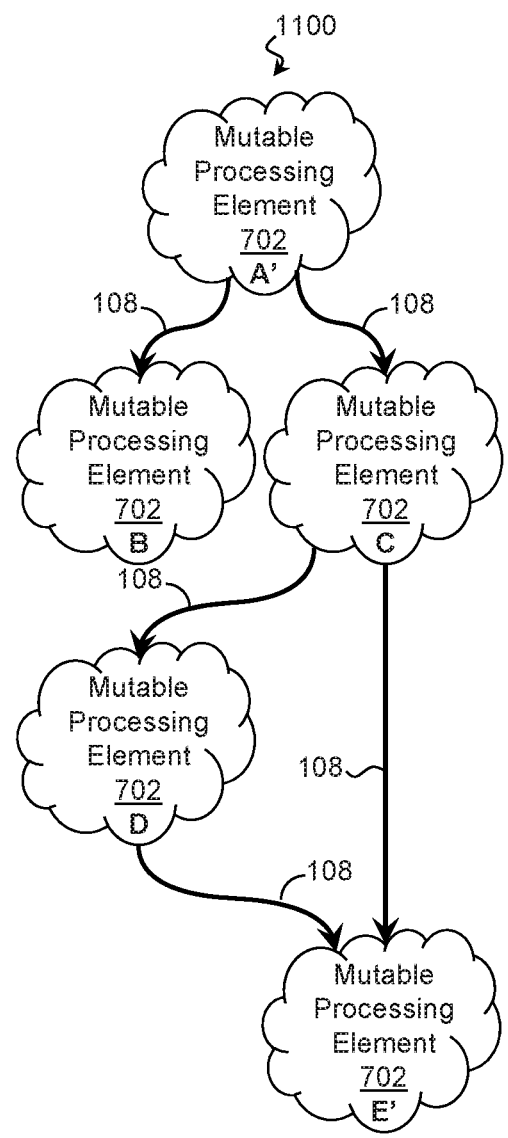
FIG. 11 is a diagram of a modified logical topology according to some examples of the present disclosure.
Figure 12:
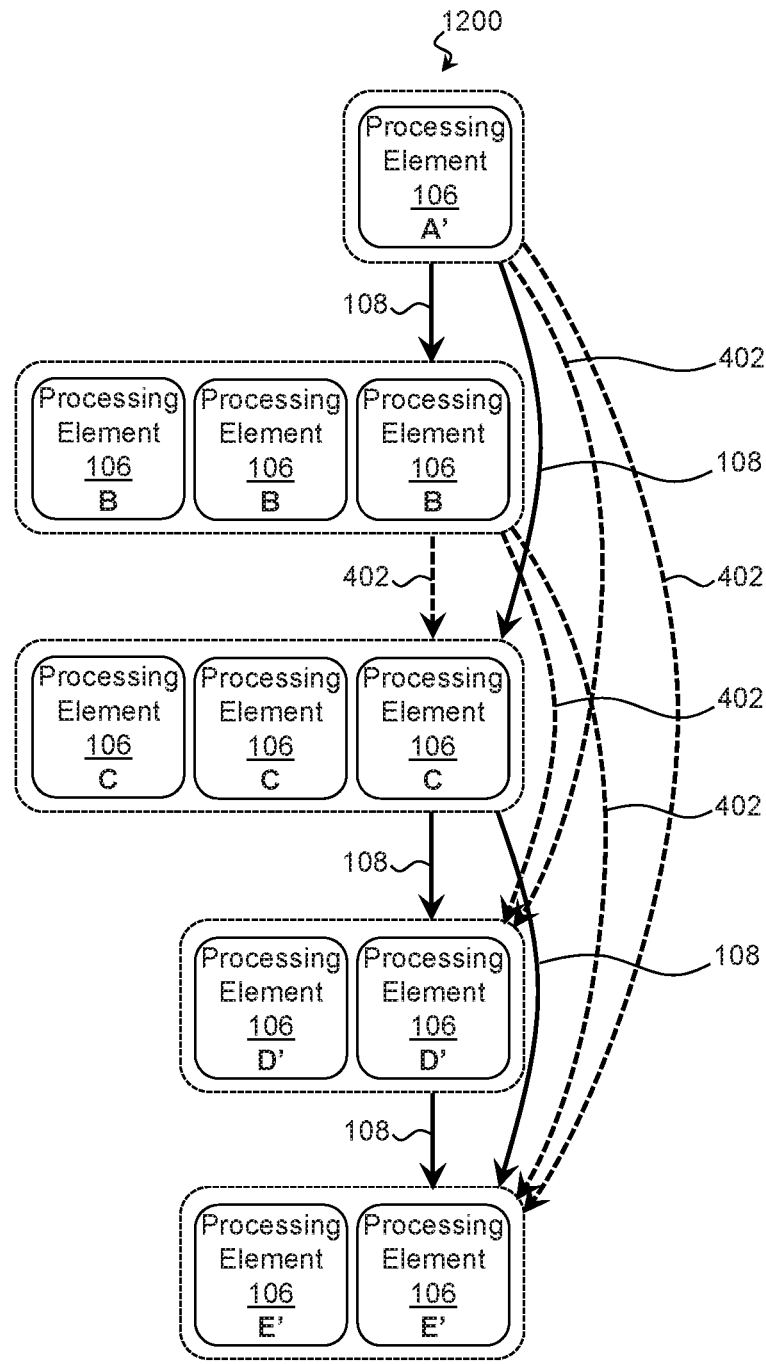
FIG. 12 is a diagram of a modified runtime topology according to some examples of the present disclosure.

Together the stream processing manager 104 and the topology manager 102 control the processing of the data stream 114 by the processing elements 106, and further examples of the technique are described with reference to FIGS. 6-12. FIG. 6 is a flow diagram of a method 600 of implementing a stream processing topology according to some examples of the present disclosure. It is understood that the description of method 600 is non-limiting, and steps may be added to and omitted from the method 600 without departing from the disclosure. Furthermore, unless noted otherwise, processes of the method 600 may be performed in any order including being performed concurrently by one or more entities. FIG. 7 is a diagram of a breadboard topology 700 according to some examples of the present disclosure. FIG. 8 is a diagram of a logical topology design 800 according to some examples of the present disclosure. FIG. 9 is a diagram of a logical topology implementation 900 according to some examples of the present disclosure. FIG. 10 is a diagram of a runtime topology 1000 according to some examples of the present disclosure. FIG. 11 is a diagram of a modified logical topology 1100 according to some examples of the present disclosure. FIG. 12 is a diagram of a modified runtime topology 1200 according to some examples of the present disclosure. The technique is suitable for performing using the using the stream processing architecture 100 of FIG. 1, the stream processing architecture 100 of FIG. 5, and/or any other stream processing architecture.

Referring first to block 602 of FIG. 6 and FIG. 7, a topology manager 102 or other computing entity initializes a breadboard topology 700. The breadboard topology 700 specifies a set of processing elements 106 and a set of interconnections 108. In the illustrated example, the breadboard topology 700 does not specify the processing elements 106 directly and instead specifies a set of mutable processing elements 702, which act as placeholders for any number of processing elements 106 operating in parallel. At runtime, the stream processing manager 104 determines how many processing elements 106 to substitute for each mutable processing element 702, and the actual number may depend on the complexity of the element-level operation, the performance of the processing element(s) 106, computational load balancing, and/or any other factor. The breadboard topology 700 may specify any number and combination of processing elements 106 and/or mutable processing elements 702.

The breadboard topology 700 specifies the flow of data between the processing elements 106 and/or mutable processing elements 702 via the set of interconnections 108. In some examples, the breadboard topology 700 has sufficient interconnections 108 that any alternative operation that uses the same number of processing elements 106/mutable processing elements 702 (or fewer) can be implemented without adding new interconnections 108. It has been determined based upon considerable analysis of topology design that certain numbers and configurations of interconnections 108 provide such a breadboard topology 700. For example, the breadboard topology 700 of FIG. 7 arranges the processing elements 106 and/or mutable processing elements 702 of the logical topology hierarchically according to the flow of data. Hierarchical levels are indicated by reference marker 704. In the example, each element (whether processing element 106 or mutable processing element 702) is in its own level 704 of the hierarchy. As can be seen, each processing element 106 and/or mutable processing element 702 has an interconnection 108 coupling an output of the element to an input of each element that is in a lower hierarchical level 704. However, interconnections 108 to elements in higher hierarchical levels 704 may be omitted.

Despite the fact that not every element is directly connected to every other element, it has been determined that such a configuration still provides the flexibility to implement any operation on the data stream that utilizes the same number of processing elements 106 and/or mutable processing elements 702 or fewer. Thus, the breadboard topology 700 achieves topographic flexibility without an excessive number of interconnections.

Referring to block 604 of FIG. 6 and to FIG. 8, the topology manager 102 receives a first logical topology (e.g., logical topology design 800) to be implemented using the breadboard topology 700. The first logical topology communicatively couples a set of processing elements 106 via a set of interconnections 108 to perform an operation on a data stream 114. In an example the topology manager 102 receives user input via the user interface module 110 that specifies aspects of the first logical topology such as the number and arrangement of the processing elements 106 and/or the element-level operations to be performed by each processing element 106. Similarly, the topology manager 102 may provide the user with information regarding the first logical topology such a graphical depiction of the first logical topology in its current state via the user interface module 110. In some examples, the topology manager 102 provides the user with information regarding the breadboard topology 700 used to implement the logical topology design 800, whereas in other examples, the user is unaware of the breadboard topology 700.

An example of a suitable topology, designated logical topology design 800, is shown in FIG. 8. In many aspects, the logical topology design 800 received in block 604 may be substantially similar to that of FIG. 3. For example, the logical topology design 800 specifies the element-level operations to be performed by the set of processing elements 106 and specifies the flow of data between the processing elements via the set of interconnections 108. The logical topology design 800 may specify particular processing elements 106 and/or mutable processing elements 702. Element-level operations assigned to the processing elements 106 and mutable processing elements 702 are designated A, B, C, D, and E. While the example of FIG. 8 includes five processing elements, it is understood that a logical topology design 800 may include any number of processing elements 106 and interconnections 108.

Referring to block 606 of FIG. 6 and to FIG. 9, the breadboard management module 112 or other computing element of the topology manager 102 defines a second logical topology (e.g., logical topology implementation 900) based on the logical topology design 800 and implemented using the breadboard topology 700. The second logical topology communicatively couples the processing elements 106 via the set of interconnections 108 and may perform the same operation on the data stream 114 as the first logical topology.

An example of a suitable topology, designated logical topology implementation 900, is shown in FIG. 9. The logical topology implementation 900 may be substantially similar to that of FIG. 4 and may specify element-level operations to be performed by the processing elements 106 designated A, B, C, D, and E. While the logical topology implementation 900 may perform the same overall and/or element-level operations on the data stream as the logical topology design 800, it may include an alternative arrangement of interconnections 108 based on the interconnections 108 of the breadboard topology 700. In the examples of FIG. 8, interconnections that communicate data that is unused by the receiving processing element are indicted by dashed lines and reference number 402. These interconnections 402 may be utilized at any time by merely changing the element-level operations of the respective processing element 106.

In some examples, the logical topology implementation 900 has sufficient interconnections 108 and 402 that any alternative operation that uses the same number of processing elements 106/mutable processing elements 702 (or fewer) can be implemented without adding new interconnections 108. In some such example the example, each element (whether processing element 106 or mutable processing element 702) is in its own level 704 of the hierarchy. As can be seen, each processing element 106 and/or mutable processing element 106 has a used interconnection 108 or an unused interconnection 402 coupling an output of the element to an input of each element that is in a lower hierarchical level 704. However, interconnections 108 to elements in higher hierarchical levels 704 may be omitted. Despite the fact that not every element is directly connected to every other element, it has been determined that such a configuration still provides the flexibility to implement any operation on the data stream that utilizes the same number of processing elements 106 and/or mutable processing elements 702 or fewer.

The breadboard management module 112 may store the breadboard topology 700, the logical topology design 800, the logical topology implementation 900, and/or related information to a topology store 506 or other suitable memory structure.

Referring to block 608 of FIG. 6 and to FIG. 10, the second logical topology (logical topology implementation 900) is provided to the stream processing manager 104 to implement using the processing elements 106. This may be performed substantially as described in block 206 of FIG. 2. It will be recognized from comparison of the respective topologies that by implementing the logical topology implementation 900, which is based on the breadboard topology 700, the stream processing manager 104, in effect, implements the breadboard topology 700.

In response to the logical topology implementation 900, the stream processing manager 104 may create a runtime topology 1000 that replaces any mutable processing elements 702 with a number of processing elements 106. The number of processing elements 106 may be determined, in part, based on the complexity of the element-level operation, the capacity of individual processing elements, load balancing considerations, and/or any other suitable factor. An example of a runtime topology 1000 that corresponds to the logical topology implementation 900 of FIG. 9 is illustrated in FIG. 10.

The stream processing manager 104 may implement the runtime topology 1000 by assigning element-level operations to the processing elements 106, defining the interconnections 108 between the processing elements 106, and/or initializing the processing elements 106 and the interconnections 108. Once implemented and initialized, the stream processing manager 104 begins processing of the incoming data stream 114 by the processing elements 106. Because the runtime topology 1000 implements the breadboard topology 700, it has the flexibility to undergo significant changes during the processing of the data stream 114.

Referring to block 610 of FIG. 6, the topology manager 102 may receive information regarding the implemented runtime topology 1000, such as identifiers of those processing elements 106 that are utilized, identifiers of those processing element(s) 106 that are assigned to a mutable processing element 702, the element-level operation assigned to each processing element 106, the configuration of interconnections 108 between the processing elements, status of the processing elements 106, and/or other suitable information. This information may be stored in the topology store 506 and fed back to the user via the user interface module 110.

Referring to block 612 of FIG. 6, the topology manager 102 may also receive information regarding the processing of the data stream. This information may include status of the processing elements, results from the stream processing (intermediate results or final results), and/or other suitable information. This information may be stored in the stream processing data store 508 and fed back to the user via the user interface module 110 to help the user evaluate the topology and the results. From this, the user may determine whether to make modifications to the topology.

Referring to block 614 of FIG. 6, the breadboard management module 112 of the topology manager 102 receives an instruction to modify the implemented topology. This instruction may be received from the user by way of the user interface module 110, from a processing element 106 or other element of the topology, or from any other source. In some examples, the instruction is received in response to a monitor running on topology manager 102 that is triggered by information received by the topology manager 102 in blocks 610 and 612. In one such example, if a processing result received in block 612 exceeds a predetermined threshold, the present topology is determined to be out-of-specification and is modified in the blocks that follow.

Referring to block 616 of FIG. 6, at any time including during the processing of the data stream, the topology manager 102 may modify an aspect of the current topology in response to the instructions. This may be performed substantially as described in block 208 of FIG. 2 and the breadboard management module 112 may modify the operations performed on the data stream by simply providing new element-level operations to the processing elements 106.

An example of one such modification is described with reference to FIGS. 11 and 12. FIG. 11 is an example of a modification to the logical topology design 800 of FIG. 8. The logical topology 1000 of FIG. 10 includes modifications to the element-level operations of the processing elements 106 of the logical topology design 800 of FIG. 8 (represented by the designations A' and E') and modifications to the interconnections between the processing elements 106. As shown in FIG. 12, to make these modifications, the topology manager 102 provides the processing elements 106 of the runtime topology 1100 with the new element-level operations A' and E' as well as a new element-level operation designated D' that effectively modifies the flow of data by changing which interconnects are used and unused by the receiving processing element 106. Accordingly, the new element-level operations may effectively change the arrangement of the processing elements 106 by utilizing data received across interconnections 402 that was previously ignored.

This may be performed without involving the stream processing manager 104, and because the interconnections 108 and 402 themselves are unchanged, in many examples, the modification to the topology may be made while the data stream is being processed without restarting the processing elements 106 or the environment. Accordingly, the method 600 provides an efficient technique for modifying a stream processing framework without restarting even when the stream processing manager 104 does not support such changes itself.

Figure 13:
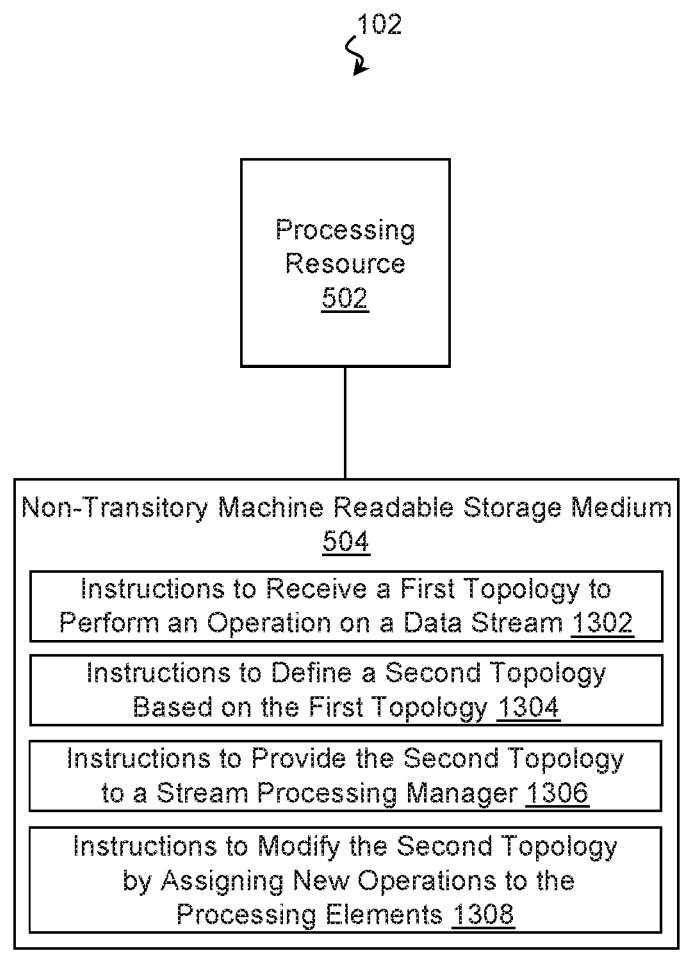
FIG. 13 is a block diagram of a topology manager including a non-transitory machine readable storage medium according to some examples of the present disclosure.

The processes of method 200 and method 600 may be performed by any combination of hard-coded and programmable logic. In some examples, a processing resource, such as the processing resource 502 of the topology manager 102, utilizes instructions stored on a non-transitory machine readable storage medium, such as the non-transitory machine readable storage medium 504, to perform at least some of these processes. Accordingly, examples of the present disclosure may take the form of a non-transitory machine readable storage medium storing instructions that perform at least part of method 200 and/or method 600. FIG. 13 is a block diagram of a suitable topology manager 102 including a non-transitory machine readable storage medium 504 according to some examples of the present disclosure.

Referring to block 1302, the non-transitory machine readable storage medium 504 may store instructions that cause the processing resource 502 to receive a first stream processing topology that communicatively couples a set of processing elements 106 via a set of interconnections 108 to perform an operation on a data stream 114. This may be performed substantially as described in block 202 of FIG. 2 and/or block 604 of FIG. 6. Referring to block 1304, the non-transitory machine readable storage medium 504 may store instructions that cause the processing resource 502 to determine a second stream processing topology based on the first topology. The second topology may perform the same operation on the data stream 114 as the first topology while including a different arrangement of interconnections. Determining the second stream processing topology may be performed substantially as described in block 204 of FIG. 2 and/or block 606 of FIG. 6.

Referring to block 1306, the non-transitory machine readable storage medium 504 may store instructions that cause the processing resource 502 to provide the second topology to a stream processing manager 104. This may be performed substantially as described in block 206 of FIG. 2 and/or block 608 of FIG. 6. Referring to block 1308, the non-transitory machine readable storage medium 504 may store instructions that cause the processing resource 502 to modify the second topology during processing of the data stream 114 by assigning a new set of element-level operations to the processing elements 106. This may be performed substantially as described in block 208 of FIG. 2 and/or block 616 of FIG. 6.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving a first topology that communicatively couples a plurality of processing elements via a first arrangement of interconnections to perform an operation on a stream of data;
defining a second topology that communicatively couples the plurality of processing elements via a second arrangement of interconnections that is different from the first arrangement of interconnections to perform the operation on the stream of data, wherein the second topology assigns the plurality of processing elements a first set of operations;
providing the second topology to a stream processing manager;
modifying the second topology during processing of the stream of data by assigning a second set of operations to the plurality of processing elements that is different from the first set of operations; and processing the stream of data according to the modified second topology without providing the modified second topology to the stream processing manager.

2. The method of claim 1, wherein the second arrangement of interconnections communicatively couples an input of a processing element of the plurality of processing elements to data that is unused by the processing element in determining an output according to the first set of operations.

3. The method of claim 2, wherein the second set of operations causes the processing element to use the data to determine the output.

4. The method of claim 1, wherein the second arrangement of interconnections communicatively couples the plurality of processing elements in a hierarchy such that an output of each processing element of the plurality of processing elements is coupled to an input of each processing element of the plurality of processing elements that is lower in the hierarchy.

5. The method of claim 4, wherein the second arrangement of interconnections is such that that the output of each processing element of the plurality of processing elements is exclusively coupled to each processing element of the plurality of processing elements that is lower in the hierarchy.

6. The method of claim 1, wherein modifying the second topology is performed in response to an outcome of processing the stream of data according to the second topology prior to modifying.

7. A non-transitory machine readable storage medium storing instructions that when executed cause a processing resource to:

receive a first stream processing topology to perform an operation on a stream of data using a set of processing elements coupled by a first arrangement of interconnections;

determine, based on the first stream processing topology, a second stream processing topology to perform the operation using the set of processing elements coupled by a second arrangement of interconnections that is different from the first arrangement of interconnections, wherein the second stream processing topology assigns a first set of operations to the set of processing elements;

provide the second stream topology to a stream processing manager; and modify the second stream topology during processing of the stream of data by assigning a second set of operations to the set of processing elements that is different from the first set of operations, wherein the second arrangement of interconnections of the second stream topology couples an input of a processing element of the set of processing elements to data that is unused by the processing element in determining an output according to the first set of operations.

8. The non-transitory machine readable storage medium of claim 7 storing instructions that when executed cause the processing resource to process the stream of data according to the modified second stream topology without providing the modified second stream topology to the stream processing manager.

9. The non-transitory machine readable storage medium of claim 7, wherein the second set of operations causes the processing element to use the data to determine the output.

10. The non-transitory machine readable storage medium of claim 7, wherein the second arrangement of interconnections couples the set of processing elements in a hierarchy such that an output of each processing element of the set of processing elements is coupled to an input of each processing element of the set of processing elements that is lower in the hierarchy.

11. A computing system comprising:

an interface module operable to receive a first topology that communicatively couples a plurality of processing elements via a first arrangement of interconnections to perform an operation on a stream of data; and a management module communicatively coupled to the interface module and operable to:

in response to the first topology, define a second topology based on the first topology that communicatively couples the plurality of processing elements via a second arrangement of interconnections that is different from the first arrangement of interconnections to perform the operation on the stream of data, wherein the second topology assigns the plurality of processing elements a first set of operations;

provide the second topology to a stream processing manager;

modify the second topology during processing of the stream of data and without providing the modified second topology to the stream processing manager, by assigning a second set of operations to the plurality of processing elements that is different from the first set of operations.

12. The computing system of claim 11, wherein the second arrangement of interconnections of the second topology communicatively couples an input of a processing element of the plurality of processing elements to data that is unused by the processing element in determining an output according to the first set of operations.

13. The non-transitory machine readable storage medium of claim 7, wherein modifying the second topology is performed in response to an outcome of processing the stream of data according to the second topology prior to modifying.

14. The non-transitory machine readable storage medium of claim 10, wherein the second arrangement of interconnections is such that that the output of each processing element of the plurality of processing elements is exclusively coupled to each processing element of the plurality of processing elements that is lower in the hierarchy.

15. The computing system of claim 12, wherein the second set of operations causes the processing element to use the data to determine the output.

16. The computing system of claim 11, wherein the second arrangement of interconnections communicatively couples the plurality of processing elements in a hierarchy such that an output of each processing element of the plurality of processing elements is coupled to an input of each processing element of the plurality of processing elements that is lower in the hierarchy.

17. The computing system of claim 16, wherein the second arrangement of interconnections is such that that the output of each processing element of the plurality of processing elements is exclusively coupled to each processing element of the plurality of processing elements that is lower in the hierarchy.

18. The computing system of claim 11, wherein the second topology is modified in response to an outcome of processing the stream of data according to the second topology prior to modifying.

* * * * *